US 12,350,826 B2

(12) United States Patent
Hoshi et al.

(10) Patent No.: US 12,350,826 B2
(45) Date of Patent: Jul. 8, 2025

(54) LOADING AND UNLOADING SYSTEM

(71) Applicant: NAKANISHI METAL WORKS CO., LTD., Osaka (JP)

(72) Inventors: Masayoshi Hoshi, Osaka (JP); Hideaki Mizutani, Osaka (JP)

(73) Assignee: NAKANISHI METAL WORKS CO., LTD., Osaka (JP)

( * ) Notice: Subject to any disclaimer, the term of this patent is extended or adjusted under 35 U.S.C. 154(b) by 176 days.

(21) Appl. No.: 18/219,395

(22) Filed: Jul. 7, 2023

(65) Prior Publication Data

US 2024/0009833 A1 Jan. 11, 2024

(30) Foreign Application Priority Data

Jul. 11, 2022 (JP) ................................. 2022-111408

(51) Int. Cl.
*B25J 9/00* (2006.01)
*B25J 5/00* (2006.01)
(Continued)

(52) U.S. Cl.
CPC ............ *B25J 9/0093* (2013.01); *B25J 5/007* (2013.01); *B25J 19/023* (2013.01); *B65G 43/08* (2013.01); *B65G 2203/0266* (2013.01)

(58) Field of Classification Search
CPC ........ B25J 9/0093; B25J 5/007; B25J 19/023; B25J 9/1697; B25J 18/00; B25J 19/00;
(Continued)

(56) References Cited

U.S. PATENT DOCUMENTS 3,613,910 A * 10/1971 Weir .................... B65G 1/0485
414/281
3,613,925 A * 10/1971 Stum .................... A01D 75/002
212/326
(Continued)

FOREIGN PATENT DOCUMENTS

CN 207890562 U * 9/2018
DE 20202926 U1 * 5/2002 ............. B65G 67/08
(Continued)

OTHER PUBLICATIONS

"Flexible Manufacturing using Automated Material Handling and Autonomous Intelligent Vehicles;" Cronin et al., 2020 31st Irish Signals and Systems Conference (ISSC) (2020, pp. 1-6); Jun. 1, 2020. (Year: 2020).*
(Continued)

*Primary Examiner* — Khoi H Tran
*Assistant Examiner* — Jorge O Peche
(74) *Attorney, Agent, or Firm* — Kratz, Quintos & Hanson, LLP

(57) ABSTRACT

A loading and unloading system includes: a robot including a robot arm; an automated guided vehicle on which the robot is mounted, the automated guided vehicle including a travel driving unit; transport conveyors; a robot controller that controls an operation of the robot arm 41 and supplies driving electric power to the robot arm; and a connector that receives electric power from outside of the loading and unloading system. The automated guided vehicle further includes: a transport controller that controls driving of the travel driving unit and the transport conveyors; and a battery that supplies electric power to the transport controller. The transport controller and the robot controller cooperate with each other to cause the transport conveyors to interlock with the robot arm.

8 Claims, 4 Drawing Sheets

(51) Int. Cl.
*B25J 19/02* (2006.01)
*B65G 43/08* (2006.01)

(58) Field of Classification Search
CPC .............. B65G 43/08; B65G 2203/0266; B65G 67/24; B65G 67/08; B65G 47/90; B60L 1/00; B60L 50/60; B60L 58/10
See application file for complete search history.

(56) References Cited

U.S. PATENT DOCUMENTS

| | | | | |
|---|---|---|---|---|
| 3,715,043 | A * | 2/1973 | Weir | B65G 67/08 198/523 |
| 3,722,717 | A * | 3/1973 | Stryczek | B60P 1/365 414/521 |
| 3,866,768 | A * | 2/1975 | Weir | B65G 67/08 198/510.1 |
| 3,941,234 | A * | 3/1976 | Balch | B26D 7/27 198/429 |
| 4,059,194 | A * | 11/1977 | Barry | B65G 63/045 414/391 |
| 4,148,404 | A * | 4/1979 | Heisler | B66B 11/006 414/280 |
| 4,266,869 | A * | 5/1981 | Kuehnle | G03G 15/22 399/206 |
| 4,764,078 | A * | 8/1988 | Neri | B25J 5/007 901/6 |
| 4,831,549 | A * | 5/1989 | Red | G05B 19/4182 700/254 |
| 5,009,560 | A * | 4/1991 | Ruder | B65G 67/08 198/588 |
| 5,067,867 | A * | 11/1991 | Ruder | B65G 67/08 414/528 |
| 5,088,873 | A * | 2/1992 | Ruder | B65G 67/08 414/667 |
| 5,174,708 | A * | 12/1992 | Ruder | B65G 67/08 414/667 |
| 5,176,485 | A * | 1/1993 | Ruder | B65G 67/08 414/688 |
| 5,814,182 | A * | 9/1998 | McElroy | B29C 66/86521 156/499 |
| 5,992,751 | A * | 11/1999 | Laser | G06K 7/10574 235/462.23 |
| 6,442,920 | B1 * | 9/2002 | Peterson | A01D 46/26 56/328.1 |
| 7,854,108 | B2 * | 12/2010 | Koselka | A01D 91/00 701/50 |
| 7,957,583 | B2 * | 6/2011 | Boca | G06T 7/75 382/154 |
| 7,967,543 | B2 * | 6/2011 | Criswell | B25J 9/0093 414/532 |
| 8,229,595 | B2 * | 7/2012 | Seelinger | G05D 1/0251 700/250 |
| 8,306,314 | B2 * | 11/2012 | Tuzel | G06T 7/74 382/209 |
| 8,360,318 | B2 * | 1/2013 | Reynolds | G06K 7/10792 73/1.01 |
| 8,411,929 | B2 * | 4/2013 | Silver | G06V 10/751 382/141 |
| 9,102,055 | B1 * | 8/2015 | Konolige | G06T 7/60 |
| 9,289,336 | B2 * | 3/2016 | Lambarth | A61G 3/0272 |
| 9,393,686 | B1 * | 7/2016 | Bradski | B25J 9/1612 |
| 9,457,970 | B1 * | 10/2016 | Zevenbergen | B25J 9/0093 |
| 9,582,001 | B1 * | 2/2017 | Holmberg | B62D 63/04 |
| 9,688,489 | B1 * | 6/2017 | Zevenbergen | B25J 11/00 |
| 9,927,815 | B2 * | 3/2018 | Nusser | B65G 57/03 |
| 9,963,331 | B1 * | 5/2018 | Holmberg | G05D 1/0212 |
| 12,005,572 | B2 * | 6/2024 | Mizoguchi | B65G 61/00 |
| 2001/0052680 | A1 * | 12/2001 | Bennington | B60P 3/0257 280/30 |
| 2003/0175429 | A1 * | 9/2003 | Molnar | C23C 4/12 427/446 |
| 2005/0100767 | A1 * | 5/2005 | Stolmar | H01M 8/04082 429/515 |
| 2007/0069892 | A1 * | 3/2007 | Paul | G08B 13/10 340/539.17 |
| 2008/0186464 | A1 * | 8/2008 | Hirano | G03F 7/7075 355/72 |
| 2008/0300723 | A1 * | 12/2008 | Ban | G05B 19/4083 901/3 |
| 2009/0118864 | A1 * | 5/2009 | Eldridge | B25J 9/1692 901/29 |
| 2010/0021272 | A1 * | 1/2010 | Ward | G05D 1/0297 700/214 |
| 2011/0320039 | A1 * | 12/2011 | Hsu | B25J 9/1692 700/254 |
| 2012/0239194 | A1 * | 9/2012 | Kagawa | B25J 9/1692 700/254 |
| 2012/0294510 | A1 * | 11/2012 | Zhang | G06V 10/145 382/154 |
| 2013/0010081 | A1 * | 1/2013 | Tenney | H04N 13/20 348/47 |
| 2013/0041508 | A1 * | 2/2013 | Hu | B25J 9/162 901/47 |
| 2013/0147944 | A1 * | 6/2013 | Zhang | G06T 7/80 348/95 |
| 2013/0151007 | A1 * | 6/2013 | Valpola | B25J 13/08 901/9 |
| 2013/0302089 | A1 * | 11/2013 | Sina | E02D 3/032 180/65.245 |
| 2013/0335535 | A1 * | 12/2013 | Kane | G01B 11/2513 348/50 |
| 2013/0345870 | A1 * | 12/2013 | Buehler | G06V 30/1914 901/47 |
| 2014/0019392 | A1 * | 1/2014 | Buibas | G06N 3/008 706/23 |
| 2015/0040970 | A1 * | 2/2015 | Garabedian | H01L 21/67173 438/94 |
| 2016/0016311 | A1 * | 1/2016 | Konolige | B25J 9/1664 901/30 |
| 2017/0283177 | A1 * | 10/2017 | Ramezani | B65G 23/22 |
| 2017/0313522 | A1 * | 11/2017 | Ramezani | B65G 21/14 |
| 2018/0118476 | A1 * | 5/2018 | Bastian | B65G 41/001 |
| 2018/0181909 | A1 * | 6/2018 | Wilkinson | G06F 16/7867 |
| 2018/0276842 | A1 * | 9/2018 | Seaman | G05B 23/0297 |
| 2019/0056718 | A1 * | 2/2019 | Satou | G06N 3/08 |
| 2019/0135551 | A1 * | 5/2019 | Sekich | B65G 43/00 |
| 2020/0023740 | A1 * | 1/2020 | Bystedt | E02F 9/22 |
| 2020/0239230 | A1 * | 7/2020 | Kozlenok | B65G 1/10 |
| 2020/0377317 | A1 * | 12/2020 | Zoghzoghy | B65G 41/003 |
| 2021/0129339 | A1 * | 5/2021 | Pipe-Mazo | B25J 13/088 |
| 2021/0146531 | A1 * | 5/2021 | Tremblay | G06N 3/046 |
| 2021/0198090 | A1 * | 7/2021 | Bando | B66F 9/063 |
| 2021/0323144 | A1 * | 10/2021 | Jeremiah | B25J 9/0018 |
| 2022/0080584 | A1 * | 3/2022 | Wicks | B25J 19/021 |
| 2022/0204066 | A1 * | 6/2022 | Bidram | B65G 1/10 |
| 2023/0173675 | A1 * | 6/2023 | Hong | B25J 9/1045 700/245 |
| 2023/0271797 | A1 * | 8/2023 | Sun | B25J 5/007 700/230 |
| 2024/0002163 | A1 * | 1/2024 | Menon | B65G 41/02 |
| 2024/0009833 | A1 * | 1/2024 | Hoshi | B65G 67/24 |
| 2024/0017399 | A1 * | 1/2024 | Rest | B25J 9/0093 |
| 2024/0189982 | A1 * | 6/2024 | Diankov | B25J 9/0093 |
| 2024/0316779 | A1 * | 9/2024 | Kanemoto | B25J 9/1687 |

FOREIGN PATENT DOCUMENTS

| | | | | |
|---|---|---|---|---|
| EP | 3590873 | A1 * | 1/2020 | ............ B25J 9/0093 |
| JP | 2017-206318 | A | 11/2017 | |
| KR | 20240126463 | A * | 8/2024 | |
| TW | 202346039 | A * | 12/2023 | ............ B25J 5/007 |

OTHER PUBLICATIONS

"Cheap Automated Guided Vehicles—concept and experiments;" Lidia-Cristina et al., 2019 20th International Carpathian Control Conference (ICCC) (2019, pp. 1-6); May 1, 2019. (Year: 2019).*

(56) References Cited

OTHER PUBLICATIONS

"Research on the Automatic Loading and Unloading Control Technology of Industrial Robots;" Luo et al., 2024 International Seminar on Artificial Intelligence, Computer Technology and Control Engineering (ACTCE) (2024, pp. 163-166); Sep. 28, 2024. (Year: 2024).*

* cited by examiner

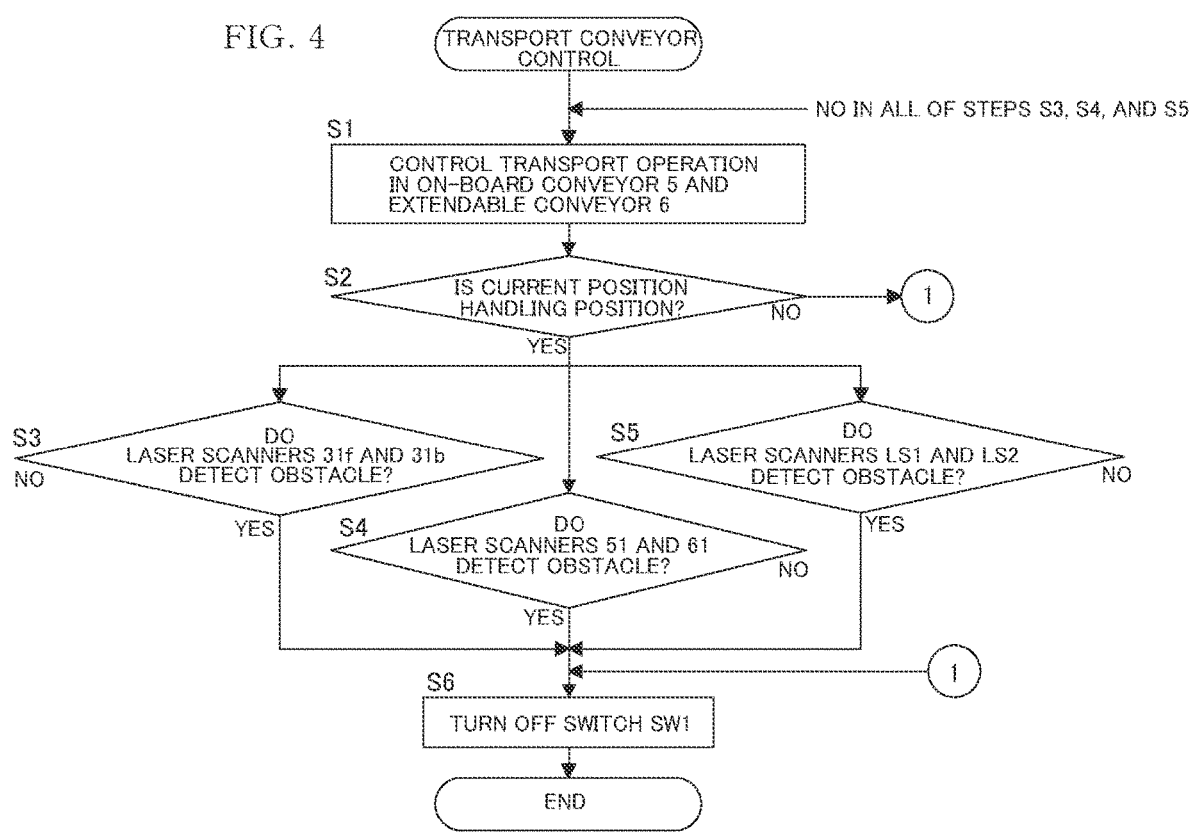

LOADING AND UNLOADING SYSTEM

BACKGROUND OF THE INVENTION

1. Technical Field

The present invention relates to a loading and unloading system for performing handling of a load.

2. Description of the Related Art

Conventionally, there has been known a loading and unloading device that is a truck capable of unmanned traveling, or what is called an automated guided vehicle (AGV), on which an articulated robot is mounted (refer to, for example, Patent Literature (PTL) 1). PTL 1 also discloses that a transport conveyor is coupled to the automated guided vehicle. With such a loading and unloading device, it is possible to perform unloading and loading of a load by the robot, and transporting of the load by the transport conveyor, while moving the robot by the automated guided vehicle. As a result, it is possible to efficiently perform handling in a cargo room of a truck, or in a container, for example.

CITATION LIST

Patent Literature

PTL 1: Japanese Unexamined Patent Application Publication No. 2017-206318

SUMMARY OF THE INVENTION

Incidentally, as described above, in a case where an automated guided vehicle on which an articulated robot is mounted is used with being coupled to a transport conveyor, a controller that controls the automated guided vehicle, a controller that controls the robot, and a controller that controls the transport conveyor are required to be provided. Therefore, the number of controllers increases, which leads to an increase in cost. In particular, in a case where the controller that controls the transport conveyor is installed on the ground, it is necessary to provide ground equipment for the transport conveyor separately from the loading and unloading device, which leads to an increase in cost.

In addition, the automated guided vehicle, the robot, and the transport conveyor may be supplied with power from a battery mounted on the loading and unloading device. In such a case, the power consumption of the robot and the transport conveyor is large, so that the time during which the loading and unloading device can operate with the battery is shortened.

An object of the present invention is to provide a loading and unloading system that makes it easy to reduce the cost of controllers and makes it easy to extend the operating time.

A loading and unloading system according to the present invention is a loading and unloading system for a load in a container, the loading and unloading system including: a robot including a robot arm capable of performing handling of the load, an automated guided vehicle on which the robot is mounted, the automated guided vehicle including a travel driving unit that causes the automated guided vehicle to travel; a transport conveyor that conveys the load; a robot controller that controls an operation of the robot arm and supplies driving electric power to the robot arm; and a power receiving unit that receives electric power to be supplied to the robot controller and the transport conveyor from outside of the loading and unloading system, in which the automated guided vehicle further includes: a transport controller that controls driving of the travel driving unit and driving of the transport conveyor; and a battery that supplies electric power to the transport controller and refrains from supplying electric power to the robot controller and the transport conveyor, and the transport controller and the robot controller cooperate with each other to cause the transport conveyor to interlock with the robot arm, thereby performing the handling of the load.

With this configuration, the electric power received from the outside of the loading and unloading system is supplied to the robot controller having large power consumption, but the electric power is not supplied from the battery. Accordingly, the consumption of the battery is reduced. As a result, it is easy to extend the operating time of the loading and unloading system. In contrast, the electric power is supplied from the battery to the transport controller necessary for traveling of the automated guided vehicle, and therefore, the automated guided vehicle can travel without being connected to a power cable, which reduces the possibility that the traveling of the automated guided vehicle is restricted by the cable. In addition, the driving of the travel driving unit and the transport conveyor is controlled by the single transport controller, and therefore, it is not necessary to provide individual controllers for the control of the travel driving unit and the control of the transport conveyor. Therefore, it is easy to reduce the cost of controller. With this configuration, it is easy to reduce the cost of controller and it is easy to extend the operating time.

In addition, it is preferable that the loading and unloading system further include a power supply wiring that distributes and supplies the electric power received from the outside by the power receiving unit, to the robot controller and the transport conveyor, the automated guided vehicle and the transport conveyor be connectable to and disconnectable from each other with a connector, and the power supply wiring be connected to the transport conveyor with the connector.

With this configuration, the electric power received from the outside by the power receiving unit is distributed and supplied to the robot controller and the transport conveyor. Accordingly, a user does not need to individually connect a power supply wiring for the robot controller and a power supply wiring for the transport conveyor, and the electric power can be supplied to the robot controller and the transport conveyor by simply connecting the single power supply wiring to the power receiving unit. In addition, the automated guided vehicle and the transport conveyor are capable of connecting to and disconnecting from each other with the connector, so that it is easy to couple the automated guided vehicle with the transport conveyor.

In addition, it is preferable that the transport controller include: a position estimating unit that estimates a current position of the automated guided vehicle; and a conveyor controlling unit that cuts off supply of the electric power received by the power receiving unit to the transport conveyor in a case where the current position estimated by the position estimating unit is different from a handling position set in advance for the handling.

With this configuration, in a case where the automated guided vehicle is located at a place different from the handling position, the supply of electric power to the transport conveyor is cut off, so that safety is improved.

In addition, it is preferable that the automated guided vehicle further include a first obstacle sensor that detects an obstacle, and the transport controller include a conveyor controlling unit that cuts off supply of the electric power received by the power receiving unit to the transport conveyor in a case where the first obstacle sensor detects the obstacle in a first field set in advance around the automated guided vehicle.

With this configuration, in a case where an obstacle is detected in the first field around the automated guided vehicle, the supply of electric power to the transport conveyor is cut off, so that safety is improved.

In addition, it is preferable that the transport conveyor further include a second obstacle sensor that detects an obstacle, and the transport controller include a conveyor controlling unit that cuts off supply of the electric power received by the power receiving unit to the transport conveyor in a case where the second obstacle sensor detects the obstacle in a second field set in advance around the transport conveyor.

With this configuration, in a case where an obstacle is detected in the second field around the transport conveyor, the supply of electric power to the transport conveyor is cut off, so that safety is improved.

In addition, it is preferable that the robot include: a camera that captures an image; and an image processing computer that performs image processing on the image captured by the camera, and the image processing computer needs predetermined time for startup and shutdown, and the battery supplies operating electric power for the image processing computer.

With this configuration, the operating electric power is supplied from the battery to the image processing computer that requires predetermined time for startup and shutdown, so that the image processing computer can start up before electric power is supplied from an external power supply. As a result, it is easy to shorten the time required for starting the operation of the loading and unloading system. In addition, even in a case where the external power supply is suddenly cut off, the possibility that the image processing computer suddenly shuts down and causes an abnormality is reduced.

In addition, it is preferable that the loading and unloading system further include an external signal receiving unit that receives a predetermined external signal from the outside of the loading and unloading system, and the transport controller control the transport conveyor based on the external signal.

With this configuration, it is easy to interlock a sensor and/or a device provided outside the loading and unloading system with the transport conveyor.

In addition, it is preferable that the external signal receiving unit be a connector for the external signal.

With this configuration, it is easy to connect the sensor and/or the device provided outside the loading and unloading system to the transport controller.

With a loading and unloading system having such a configuration, it is easy to reduce the cost of controller and it is easy to extend the operating time.

BRIEF DESCRIPTION OF THE DRAWINGS

FIG. 4 is a flowchart illustrating an example of an operation of a conveyor controlling unit illustrated in FIG. 3.

DETAILED DESCRIPTION

Figure 1:
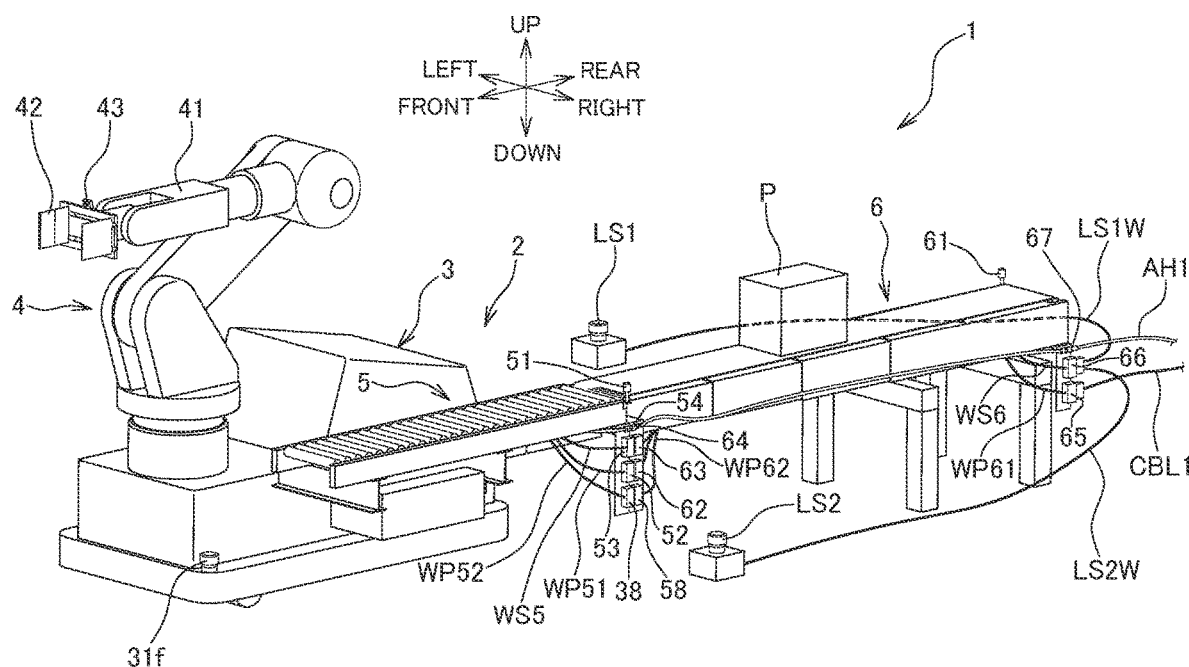
FIG. 1 is a conceptual diagram illustrating an example of a configuration of a loading and unloading system according to an embodiment of the present invention.

Hereinafter, an embodiment according to the present invention will be described with reference to the drawings. In the drawings, components with the same reference numeral are the same, and the description of the same component may be omitted. FIG. 1 is a conceptual diagram illustrating an example of a configuration of a loading and unloading system according to an embodiment of the present invention. In each drawing, front and rear, right and left, and up and down directions are illustrated for convenience. Note that the front and rear, right and left, and up and down directions are an example, and directions are not limited to this example.

A loading and unloading system 1 illustrated in FIG. 1 includes a loading and unloading device 2 and laser scanners LS1 and LS2. The loading and unloading device 2 includes an automated guided vehicle 3, a robot 4, an on-board conveyor 5, and an extendable conveyor 6. Note that the loading and unloading system 1 need not include the laser scanners LS1 and LS2, and the loading and unloading system may include only the loading and unloading device 2.

It is preferable that the laser scanners LS1 and LS2 be disposed so that the entire installation field of the loading and unloading device 2 is included in an area in which an obstacle can be detected. For example, it is preferable that the laser scanner LS1 be installed on the left side of the loading and unloading device 2 and the laser scanner LS2 be installed on the right side of the loading and unloading device 2 so that the loading and unloading device 2 is sandwiched between the laser scanners LS1 and LS2. With this arrangement, it is easy to detect whether an obstacle is present in an installation place of the loading and unloading device 2, more specifically, whether there is a person in the installation place of the loading and unloading device 2.

The automated guided vehicle 3 is a transport vehicle capable of autonomously traveling. The robot 4 is mounted on the front part of the automated guided vehicle 3, the on-board conveyor 5 is attached to the right side of the automated guided vehicle 3, and the extendable conveyor 6 is coupled to the rear end of the on-board conveyor 5. A laser scanner $31f$ is attached, for example, near a corner in the right front part of the automated guided vehicle 3, and a laser scanner $31b$ (FIG. 2) is attached, for example, near a corner in the left rear part. The laser scanners $31f$ and $31b$ correspond to an example of a first obstacle sensor.

The robot 4 is, for example, an articulated robot, and includes a robot arm 41. A robot hand 42 is attached to a distal end of the robot arm 41. A camera 43 configured to capture a load P to be handled is attached to the robot hand 42.

The on-board conveyor 5 is, for example, a conveyor capable of transporting the load P in the front-rear direction. FIG. 1 illustrates a roller conveyor as an example. The on-board conveyor 5 transports the load P sent from the extendable conveyor 6 on the rear side, to a front position where the load P can be handled by the robot arm 41. Also, the on-board conveyor 5 transports the load P placed on the front position by the robot arm 41 to the extendable conveyor 6 on the rear side.

A laser scanner 51 is attached, for example, near the right rear end of the on-board conveyor 5. In addition, connectors 38, 52, and 53 and a joint 54 are attached near the rear end of the on-board conveyor 5, that is, near a coupling part to the extendable conveyor 6.

The extendable conveyor 6 can extend and retract along the transport direction of the load P. As the extendable conveyor 6, various types of conveyors known as what is called an extendable conveyor can be used. For example, the extendable conveyor 6 is not limited to a belt conveyor that extends and retracts with a telescopic structure as illustrated in FIG. 1, and may be a roller conveyor that extends and retracts like an accordion and is provided with casters on legs supporting the conveyor. A laser scanner 61 is attached, for example, near the left rear end of the extendable conveyor 6. In addition, connectors 58, 62, and 63 and a joint 64 are attached near the front end of the extendable conveyor 6, that is, near a coupling part to the on-board conveyor 5. Connectors 65 and 66 and a joint 67 are attached near the rear end of the extendable conveyor 6.

The connectors 38, 52, 58, 62, and 65 are connectors for power supply wirings, and the connectors 53, 63, and 66 are connectors for signal wirings. The joints 54, 64, and 67 are joints for pipes such as air hoses. The connectors 58, 62, and 63 are capable of connecting to and disconnecting from the connectors 38, 52, and 53, respectively. The connectors 58, 62, and 63 may be directly connected, or may be electrically connected, with cables, to the connectors 38, 52, and 53, respectively. The joint 54 is capable of connecting to and disconnecting from the joint 64. The joint 54 and the joint 64 may be directly connected, or may be indirectly connected, with a pipe, to each other.

The connector 65 and the connector 62 are connected to each other with a power supply wiring WP61, the connector 52 is connected to a connector 55 described later with a power supply wiring WP51, the connector 38 is connected to a connector 57 described later with a power supply wiring WP52, and the connector 58 is connected to a power supply wiring WP62. The connector 66 and the connector 63 are connected to each other with a signal wiring WS6, and the connector 53 is connected to a connector 56 described later with a signal wiring WS5.

The connector 65 can connect to a cable CBL1. The cable CBL1 is connected to an external power supply (not illustrated) provided outside the loading and unloading system 1. With this configuration, the connector 65 is connected to the external power supply with the cable CBL1. The connector 65 corresponds to an example of a power receiving unit. As the external power supply, for example, a three-phase AC power supply such as AC 200V can be used. By using the three-phase AC power supply as the external power supply, it is possible to supply sufficient electric power to the robot 4, the on-board conveyor 5, and the extendable conveyor 6, which have large power consumption.

The connector 66 can connect to signal wirings LS1W and LS2W. The signal wiring LS1W is connected to the laser scanner LS1, and the signal wiring LS2W is connected to the laser scanner LS2. With this configuration, the connector 66 is connected to the laser scanner LS1 with the signal wiring LS1W and is connected to the laser scanner LS2 with the signal wiring LS2W. The connector 66 corresponds to an example of an external signal receiving unit. Note that the signal wirings LS1W and LS2W may be connected to the connector 63 or the connector 53. In this case, the connector 63 or the connector 53 corresponds to an example of the external signal receiving unit.

The joint 67 can connect to an air hose AH1. The air hose AH1 is connected to an air source such as an air compressor (not illustrated) provided outside the loading and unloading system 1. With this configuration, the joint 67 is connected to the air source with the air hose AH1. The joint 67 and the joint 64 are connected to each other with a pipe, and the joint 54 is connected to a robot controller 45 described later with a pipe. With this configuration, the air supplied from the air source is supplied to the robot arm 41 and the robot hand 42 through the joints 54, 64, and 67 and the robot controller 45, and is used to drive the robot arm 41 and the robot hand 42.

The on-board conveyor 5 and the extendable conveyor 6 correspond to examples of a transport conveyor, and the laser scanners 51 and 61 correspond to examples of a second obstacle sensor.

As the laser scanners 31$f$, 31$b$, 51, 61, LS1, and LS2, for example, the light detection and ranging (LiDAR) can be used. With such a laser scanner, it is possible to acquire shapes of and distances to an object, obstacle, and the like in the surroundings by scanning the surroundings with laser light and measuring time until the laser light is reflected and returns. Therefore, it is possible to detect surrounding obstacles by using the laser scanners 31$f$, 31$b$, 51, 61, LS1, and LS2.

The automated guided vehicle 3 can travel using a so-called simultaneous localization and mapping (SLAM) on the basis of data acquired by the laser scanners 31$f$ and 31$b$. Specifically, the automated guided vehicle 3 creates an environment map (mapping) and estimates a self-location (localization) on the basis of the data acquired by the laser scanners 31$f$ and 31$b$, and can therefore autonomously travel. As described above, the laser scanners 31$f$ and 31$b$ have both the function as the first obstacle sensor that detects an obstacle and the function as a sensor for traveling using SLAM.

Note that the laser scanners 31$f$ and 31$b$ are not limited to an example in which the laser scanners 31$f$ and 31$b$ are used as sensors for traveling using SLAM. The first, second, and third obstacle sensors only need to be able to detect an obstacle, and are not limited to laser scanners such as LiDAR. For example, the automated guided vehicle 3 may travel using SLAM with images captured by a camera, or may travel along magnetic markers or the like installed on a floor surface. Various traveling methods can be used.

Figure 2:
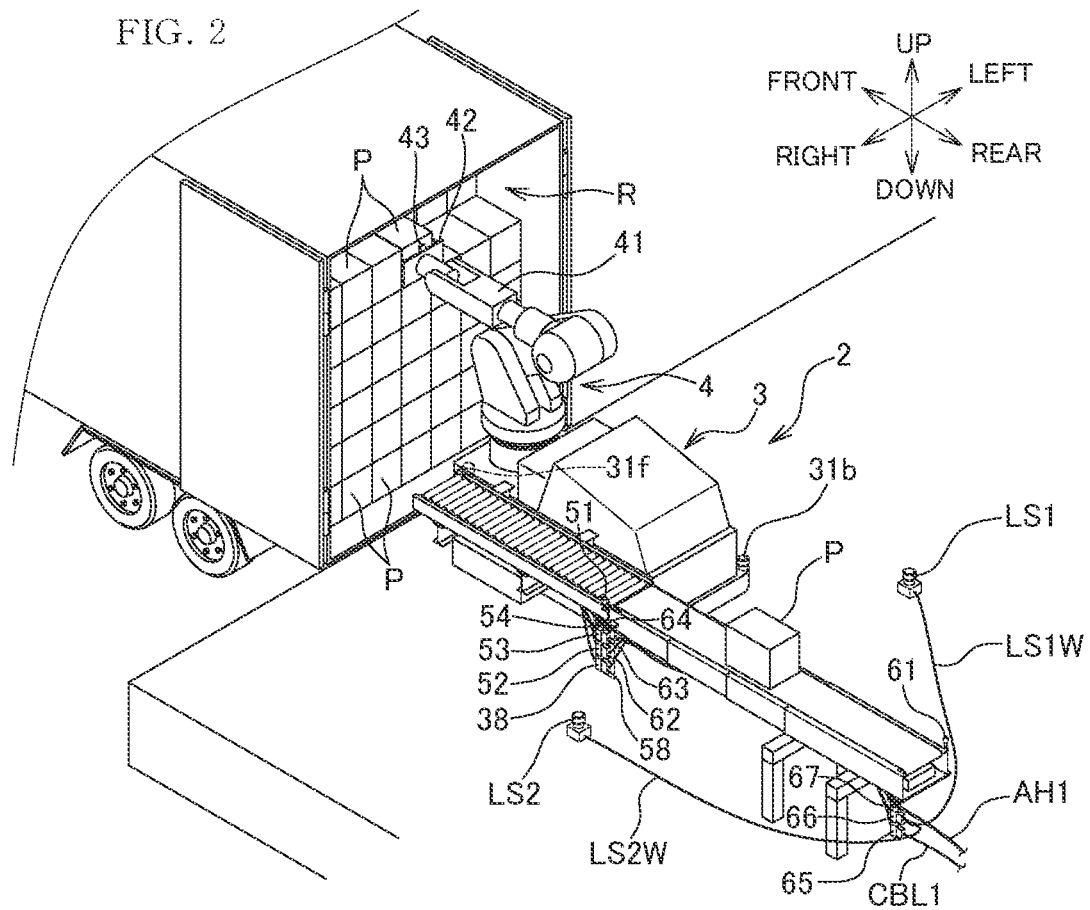
FIG. 2 is an explanatory diagram for explaining a handling operation by the loading and unloading system illustrated in FIG. 1.

FIG. 2 is an explanatory diagram for explaining the handling operation by the loading and unloading system 1 illustrated in FIG. 1. FIG. 2 illustrates the handling operation related to loading of the loads P into a cargo room R of a truck or unloading of the loads P from the cargo room R of the truck.

For example, in a case where unloading is performed, the automated guided vehicle 3 is positioned near the entrance of the cargo room R, the loads P loaded in the cargo room R are taken out by the robot arm 41 and placed on the on-board conveyor 5, the loads P are transported to the extendable conveyor 6 by the on-board conveyor 5, and the extendable conveyor 6 transports the loads P to a desired transport destination. When the unloading of the loads P near the entrance of the cargo room R is completed, the automated guided vehicle 3 enters the cargo room R and continues the unloading of the loads P loaded at the back of the cargo room R.

In a case where loading of the loads P is performed, contrary to unloading, the automated guided vehicle 3 loads the load P from the back of the cargo room R and goes in the reverse direction as the loading progresses.

As described above, the automated guided vehicle 3 moves in accordance with the progress of unloading or loading of the loads P. Accordingly, the extendable conveyor 6 extends and retracts as the automated guided vehicle 3 moves, thereby allowing the handling operation of the loads P to be continuously and efficiently performed. In addition, in order to perform handling of the load P, the automated guided vehicle 3, the robot arm 41, the on-board conveyor 5, and the extendable conveyor 6 need to be interlocked with each other.

Figure 3:
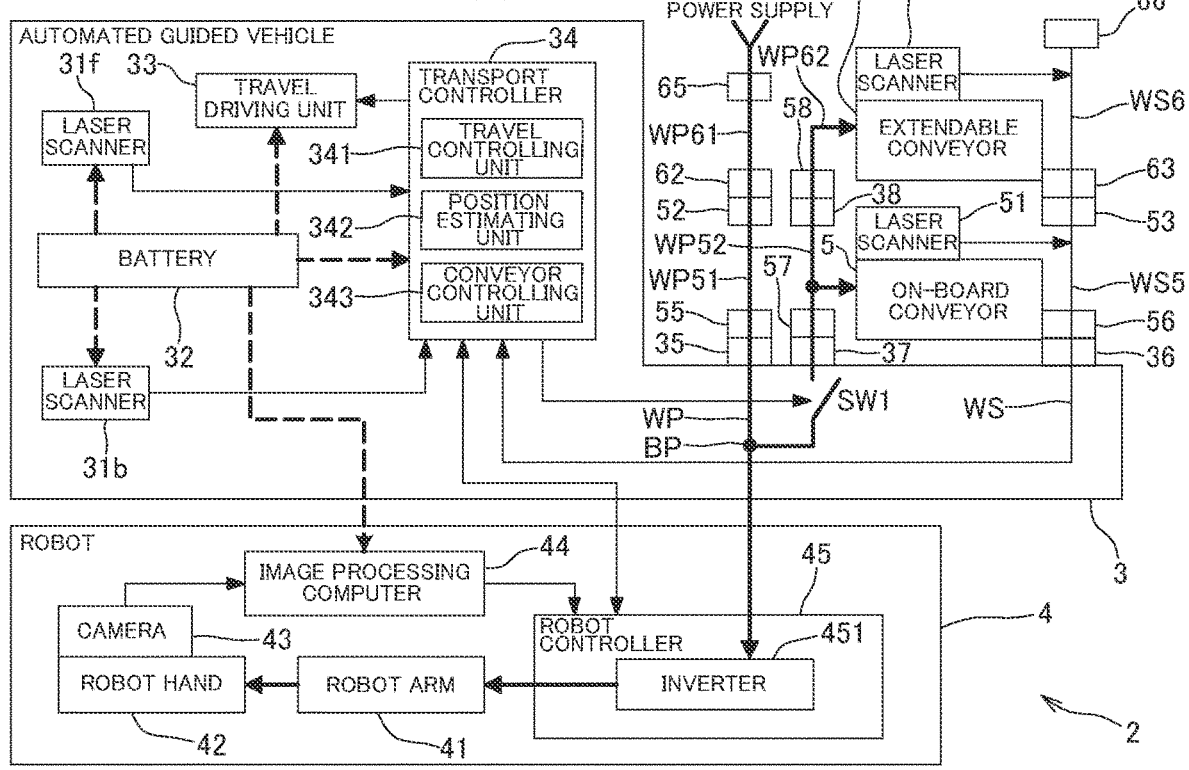
FIG. 3 is a block diagram illustrating an example of an electrical configuration of a loading and unloading device illustrated in FIG. 1.

FIG. 3 is a block diagram illustrating an example of an electrical configuration of the loading and unloading device 2 illustrated in FIG. 1. In FIG. 3, a supply path of the electric power supplied from the outside of the loading and unloading system 1 is indicated by a thick line, a supply path of the electric power supplied from a battery 32 is indicated by a broken line, and a signal path is indicated by a thin line.

The loading and unloading device 2 illustrated in FIG. 3 includes the automated guided vehicle 3, the robot 4, the on-board conveyor 5 (transport conveyor), the extendable conveyor 6 (transport conveyor), the laser scanners 51 and 61 (second obstacle sensors), the connectors 35 to 38, 52, 53, 55 to 58, 62, 63, 65, and 66, the signal wirings WS, WS5, and WS6, and the power supply wirings WP, WP51, WP52, WP61, and WP62.

The connectors 55, 56, and 57 are attached to the on-board conveyor 5, and the connectors 35, 36, and 37 are attached to the automated guided vehicle 3. The connectors 55, 56, and 57 are capable of connecting to and disconnecting from the connectors 35, 36, and 37, respectively. With this configuration, the on-board conveyor 5 is capable of electrically connecting to and disconnecting from the automated guided vehicle 3.

The automated guided vehicle 3 includes the laser scanners 31$f$ and 31$b$ (first obstacle sensor), the battery 32, a travel driving unit 33, a transport controller 34, a switch SW1, the power supply wiring WP, and the signal wiring WS. The robot 4 includes the robot arm 41, the robot hand 42, the camera 43, an image processing computer 44, and the robot controller 45.

One end of the power supply wiring WP of the automated guided vehicle 3 is connected to the connector 35. With this configuration, the electric power received from the external power supply by the connector 65 (power receiving unit) is supplied to the power supply wiring WP. The power supply wiring WP is connected to the connectors 37 and 57, the power supply wiring WP52, the connectors 38 and 58, and the power supply wiring WP62, with the switch SW1. The power supply wiring WP52 is connected to the on-board conveyor 5, and the power supply wiring WP62 is connected to the extendable conveyor 6. With this configuration, the power supply wirings WP, WP52, and WP62 distribute and supply the electric power received by the connector 65 to the robot controller 45, the on-board conveyor 5, and the extendable conveyor 6.

The power received by the connector 65 is distributed and supplied to the robot controller 45, the on-board conveyor 5, and the extendable conveyor 6 with the power supply wirings WP, WP52, and WP62. Therefore, a user does not need to individually connect the power supply wirings from the external power supply to the robot controller 45, the on-board conveyor 5, and the extendable conveyor 6. As a result, the user only needs to connect the one cable CBL1 from the external power supply to the connector 65, so that the convenience for the user is improved.

In addition, the automated guided vehicle 3 and the on-board conveyor 5 are capable of electrically connecting to and disconnecting from each other with the connectors 55, 56, and 57 and the connectors 35, 36, and 37. Therefore, the wiring operation at the time of coupling the automated guided vehicle 3 to the on-board conveyor 5 only requires the connectors to be connected, so that the coupling operation between the automated guided vehicle 3 and the on-board conveyor 5 is simplified. Note that the automated guided vehicle 3 and the on-board conveyor 5 may be integrally constructed, and the loading and unloading device 2 need not include the connectors 37 and 57.

The switch SW1 is interposed between a branch point BP on the power supply wiring WP, and the on-board conveyor 5 and the extendable conveyor 6. The switch SW1 opens and closes in accordance with a control signal from the transport controller 34. With this configuration, the transport controller 34 can supply the electric power to the on-board conveyor 5 and the extendable conveyor 6, that is, the transport controller 34 can control driving of the on-board conveyor 5 and the extendable conveyor 6.

The signal wiring WS connects the connector 36 to the transport controller 34. With this configuration, the transport controller 34 can acquire detection data of the laser scanners 51 and 61 (second obstacle sensor) and acquire detection data of the laser scanners LS1 and LS2 (third obstacle sensor) provided outside and connected to the connector 66 (external signal receiving unit).

The battery 32 supplies the operating electric power to the transport controller 34, the laser scanners 31$f$ and 31$b$, the travel driving unit 33, and the image processing computer 44. As the battery 32, various secondary batteries can be suitably used. The battery may be supplied with electric power from the external power supply. With this configuration, even in a case where the battery cannot be replaced, electric power can be supplied to the battery.

The battery 32 does not supply the electric power to the robot controller 45, the robot arm 41, and the robot hand 42, which have large power consumption. As described above, the electric power supplied from the external power supply is supplied to the robot controller 45, the on-board conveyor 5, and the extendable conveyor 6, and the electric power is supplied from the robot controller 45 to the robot arm 41 and the robot hand 42. With this configuration, the amount of discharge of the battery 32 can be reduced, so that it is easy to extend the continuous operating time of the loading and unloading system 1.

In contrast, the battery 32 supplies the electric power to the transport controller 34, the laser scanners 31$f$ and 31$b$, and the travel driving unit 33, which are necessary for the loading and unloading device 2 to autonomously travel, so that it is possible to cause the loading and unloading device 2 to travel without connecting a cable that hinders the traveling to the loading and unloading device 2. With this configuration, it is easy to extend the continuous operating time of the loading and unloading system 1 while securing the degree of freedom in traveling of the loading and unloading device 2.

The travel driving unit 33 is a motor or the like configured to drive wheels (not illustrated) allowing the automated guided vehicle 3 to travel. The travel driving unit 33 operates in accordance with a control signal from the transport controller 34.

The transport controller 34 includes, for example, a central processing unit (CPU) that executes predetermined arithmetic processing, a random access memory (RAM) that temporarily stores data, a nonvolatile storage device, and peripheral circuits for these components. Then, the transport controller 34 functions as a travel controlling unit 341, a position estimating unit 342, and a conveyor controlling unit 343, for example, by executing a program stored in advance in the above-described storage device.

The position estimating unit 342 estimates the current position of the automated guided vehicle 3 by the SLAM technique described above, for example, on the basis of the data acquired by the laser scanners 31*f* and 31*b*, for example.

On the basis of the current position of the automated guided vehicle 3 estimated by the position estimating unit 342, the travel controlling unit 341 controls the travel driving unit 33 using, for example, the SLAM technique described above to cause the automated guided vehicle 3 to autonomously travel.

The conveyor controlling unit 343 controls the transport operation of the load P by the on-board conveyor 5 and the extendable conveyor 6. In addition, the conveyor controlling unit 343 executes safety control for stopping the on-board conveyor 5 and the extendable conveyor 6 on the basis of the current position of the automated guided vehicle 3 and the detection results of the obstacles by the laser scanners 31*f*, 31*b*, 51, 61, LS1, and LS2.

Conventionally, control of an automated guided vehicle is generally executed by a controller mounted on the automated guided vehicle, and control of a conveyor is generally executed by a controller installed on the ground. In contrast, with the transport controller 34, the control of the travel driving unit 33 by the travel controlling unit 341 and the control of the on-board conveyor 5 and the extendable conveyor 6 by the conveyor controlling unit 343 can be executed by the one transport controller 34. As a result, it is easy to reduce the number of controllers required in the entire system and reduce the cost of controller.

The camera 43 of the robot 4 includes an imaging element such as a complementary metal oxide semiconductor (CMOS) or a charge coupled device (CCD), for example, and captures an image of the view in front of the robot hand 42.

The image processing computer 44 executes image processing for extracting an outline, image processing such as processing of recognizing the load P, and the like on the image captured by the camera 43. Then, the image processing computer 44 transmits data of the image processing result to the robot controller 45.

The image processing computer 44 is operated by, for example, an operating system (OS) such as Windows (registered trademark), and requires predetermined time for startup and shutdown. Accordingly, if the operating electric power for the image processing computer 44 is supplied from an external power supply connected to the connector 65, for example, and a user suddenly pulls out the cable CBL1 from the connector 65, the image processing computer 44 cannot be normally shut down, which may cause an abnormality to occur in the image processing computer 44. In addition, also when a user connects the cable CBL1 to the connector 65, it takes time from when the electric power is supplied to the image processing computer 44 to when the image processing computer 44 starts up, so that it takes time for starting the operation of the loading and unloading system 1.

Here, in the loading and unloading system 1, the operating electric power is supplied from the battery 32 to the image processing computer 44, so that an abnormality does not occur in the image processing computer 44 even if a user suddenly pulls out the cable CBL1 from the connector 65, for example. In addition, the image processing computer 44 can start up in advance using the electric power supplied from the battery 32 before a user connects the cable CBL1 to the connector 65. Accordingly, it is easy to shorten the time for starting the operation of the loading and unloading system 1 after the user connects the cable CBL1 to the connector 65.

The robot controller 45 includes a control circuit (not illustrated) and an inverter 451. The inverter 451 converts the electric power supplied from the external power supply through the power supply wiring WP into driving electric power for servomotors or the like configured to drive the robot arm 41 and the robot hand 42. Specifically, the inverter 451 generates a frequency, a voltage, and a current according to a control signal of the robot controller 45 and supplies the frequency, the voltage, and the current to the robot arm 41 and the robot hand 42, thereby causing the robot arm 41 and the robot hand 42 to perform an operation according to an instruction of the robot controller 45.

Note that the robot controller 45 only needs to supply the driving electric power to the robot arm 41, and is not necessarily limited to an example including the inverter 451.

The robot controller 45 can also control the movement of the robot arm 41 and the robot hand 42 by controlling the supply of air received by the joint 67 to the robot arm 41 and the robot hand 42.

As described above, the robot controller 45 supplies the electric power and the air to the robot arm 41 and the robot hand 42 and outputs control signals on the basis of the image processing result or the like obtained from the image processing computer 44, thereby causing the robot arm 41 and the robot hand 42 to perform the handling operation.

The robot controller 45 can communicate with the transport controller 34. Through the communication, the robot controller 45 and the transport controller 34 can perform a cooperative operation. As a result, it is possible to cause the on-board conveyor 5, the extendable conveyor 6, and the robot 4 to perform an interlocking operation, and it is easy to cause the loading and unloading system 1 to smoothly perform the handling operation.

FIG. 4 is a flowchart illustrating an example of the operation of the conveyor controlling unit 343 illustrated in FIG. 3. First, the conveyor controlling unit 343 interlocks with the operation of loading and taking out the load P by the robot 4 on and from the on-board conveyor 5 and the operation of loading and taking out the load P by a user on and from the extendable conveyor 6, so as to control the transport operation of the load P using the on-board conveyor 5 and the extendable conveyor 6 (step S1). In FIG. 3, a description of a configuration related to detailed control such as a change in the conveying direction of the on-board conveyor 5 and the extendable conveyor 6 is omitted.

In FIG. 4, for convenience of description, the transport operation control of step S1 and steps S2 to S6 are described as separate steps, but steps S2 to S6 are a part of the transport operation control, and step S1 and steps S2 to S6 are executed in parallel. For example, in a case of NO in step S2 or YES in any of steps S3 to S5 from the startup of the loading and unloading device 2, the switch SW1 is turned off from the beginning and the on-board conveyor 5 and the extendable conveyor 6 are not driven in step S1.

Next, the conveyor controlling unit 343 confirms whether the current position of the automated guided vehicle 3 estimated by the position estimating unit 342 is the handling position set in advance for handling (step S2). When the current position of the automated guided vehicle 3 is different from the handling position (NO in step S2), the conveyor controlling unit 343 turns off the switch SW1 to cut off the supply of the electric power received by the connector 65 to the on-board conveyor 5 and the extendable conveyor 6, and stops the on-board conveyor 5 and the extendable conveyor 6 (step S6).

In the example illustrated in FIG. 2, for example, a position at which the robot arm 41 reaches the entrance of the cargo room R and the inside of the cargo room R can be suitably set as the handling positions. With this configuration, in a case where the automated guided vehicle 3 is not stopped at the handling position, or in a case where an operation of coupling the on-board conveyor 5 to the extendable conveyor 6 is performed at a position away from the handling position, it is possible to cut off power supply to the on-board conveyor 5 and the extendable conveyor 6, so that safety can be improved.

When the current position of the automated guided vehicle 3 is the handling position (YES in step S2), the conveyor controlling unit 343 executes steps S3, S4, and S5 in parallel. In step S3, the conveyor controlling unit 343 confirms whether an obstacle is detected in a first field preset in advance around the automated guided vehicle 3 using the laser scanners 31*f* and 31*b* (step S3).

In a case where at least one of the laser scanners 31*f* and 31*b* detects an obstacle in the first field (YES in step S3), the conveyor controlling unit 343 turns off the switch SW1 to cut off the supply of the electric power received by the connector 65 to the on-board conveyor 5 and the extendable conveyor 6, and stops the on-board conveyor 5 and the extendable conveyor 6 (step S6).

As the first field, for example, an area of about 1 to 2 m around the automated guided vehicle 3 can be suitably set. With this configuration, in a case where an obstacle such as a person is present around the automated guided vehicle 3, the on-board conveyor 5 and the extendable conveyor 6 can be stopped, so that safety can be improved.

The processing in a case where no obstacle is detected in the first field by the laser scanners 31*f* and 31*b* (NO in step S3) will be described later.

In step S4, the conveyor controlling unit 343 confirms whether an obstacle is detected in a second field preset in advance around the on-board conveyor 5 and the extendable conveyor 6 using the laser scanners 51 and 61 (step S4).

In a case where at least one of the laser scanners 51 and 61 detects an obstacle in the second field (YES in step S4), the conveyor controlling unit 343 turns off the switch SW1 to cut off the supply of the electric power received by the connector 65 to the on-board conveyor 5 and the extendable conveyor 6, and stops the on-board conveyor 5 and the extendable conveyor 6 (step S6). With this configuration, in a case where an obstacle such as a person is present around the on-board conveyor 5 and the extendable conveyor 6, the on-board conveyor 5 and the extendable conveyor 6 can be stopped, so that safety can be improved.

The processing in a case where no obstacle is detected in the second field by the laser scanners 51 and 61 (NO in step S4) will be described later.

In step S5, the conveyor controlling unit 343 confirms whether an obstacle is detected in the installation place of the loading and unloading device 2 using the laser scanners LS1 and LS2 (step S5).

In a case where at least one of the laser scanners LS1 and LS2 detects an obstacle in the installation place of the loading and unloading device 2 (YES in step S5), the conveyor controlling unit 343 turns off the switch SW1 to cut off the supply of the electric power received by the connector 65 to the on-board conveyor 5 and the extendable conveyor 6, and stops the on-board conveyor 5 and the extendable conveyor 6 (step S6). With this configuration, in a case where an obstacle such as a person is present in the installation place of the loading and unloading device 2, the on-board conveyor 5 and the extendable conveyor 6 can be stopped, so that safety can be improved.

In a case where the laser scanners LS1 and LS2 do not detect an obstacle in the installation place of the loading and unloading device 2 (NO in step S5) with NO in steps S3 and S4, that is, in a case of NO in all of steps S3. S4, and S5, steps S1 to S6 are repeated.

As described above, the loading and unloading system 1 need not include the laser scanners LS1 and LS2. In a case where the loading and unloading system 1 does not include the laser scanners LS1 and LS2, output signals of the laser scanners LS1 and LS2 correspond to an example of the external signal, and the connector 66 corresponds to an example of the external signal receiving unit. In this case, the connector 66 that is the external signal receiving unit receives the output signals of the laser scanners LS1 and LS2 that are the external signals, and the transport controller 34 including the conveyor controlling unit 343 controls the operations of the on-board conveyor 5 and the extendable conveyor 6 (transport conveyor) in steps S5 and S6 on the basis of the output signals of the laser scanners LS1 and LS2.

Note that the external signals received by the connector 66 that is the external signal receiving unit are not limited to the output signals of the laser scanners LS1 and LS2.

Various sensors and/or devices can be connected to the external signal receiving unit such as the connector 66, and the transport controller 34 may control the operations of the on-board conveyor 5 and the extendable conveyor 6 on the basis of the external signals from the various sensors and/or devices received by the external signal receiving unit. With this configuration, the transport controller 34 can control the on-board conveyor 5 and the extendable conveyor 6 in cooperation with various sensors and/or devices outside the loading and unloading system 1.

The external signal receiving unit is not limited to a connector. However, by using a connector as the external signal receiving unit, even in a case where the number of signal lines of the sensors and/or the devices outside the loading and unloading system 1 increases, it is easy to connect these signal lines to the loading and unloading device 2. Therefore, the convenience of the user is improved.

Although the example in which the loading and unloading device 2 includes the on-board conveyor 5 and the extendable conveyor 6 has been described, the loading and unloading device 2 need not include the extendable conveyor 6. In addition, the loading and unloading device 2 need not include the on-board conveyor 5, and the extendable conveyor 6 may be connected to the automated guided vehicle 3. In addition, the loading and unloading device 2 may include the on-board conveyor 5 and a plurality of the extendable conveyors 6. In this case, the plurality of extendable conveyors 6 may be coupled to one another with a connector in an electrically connectable and disconnectable manner. In addition, the on-board conveyor 5 and the extendable conveyor 6 may be disposed in a state of being separated from the automated guided vehicle 3 without being connected to the automated guided vehicle 3.

In addition, the robot controller 45 is not limited to be mounted on the loading and unloading device 2, and may be installed outside the loading and unloading device 2.

In addition, the loading and unloading system 1 need not include the connector 66, and need not control the operations of the on-board conveyor 5 and the extendable conveyor 6 on the basis of an external signal. In addition, the image processing computer 44 is not limited to an example in which the electric power is supplied from the battery 32 to the image processing computer 44, and the electric power supplied from the outside may be supplied to the image processing computer 44. In addition, the image processing computer 44 may be omitted.

In addition, the loading and unloading system 1 need not include the laser scanners LS1 and LS2, and the conveyor controlling unit 343 need not execute step S5. In addition, the on-board conveyor 5 need not include the laser scanner 51, the extendable conveyor 6 need not include the laser scanner 61, and the conveyor controlling unit 343 need not execute step S4. In addition, the automated guided vehicle 3 need not include the laser scanners 31f and 31b, and the conveyor controlling unit 343 need not execute step S3.

In addition, the transport controller 34 need not include the position estimating unit 342, and the conveyor controlling unit 343 need not execute step S2.

In addition, the automated guided vehicle 3 and the on-board conveyor 5 are not limited to an example in which the automated guided vehicle 3 is coupled to the on-board conveyor 5 with the connectors 35, 36, and 37 and the connectors 55, 56, and 57 in an electrically connectable and disconnectable manner, and the loading and unloading device 2 may not include the connectors 35, 36, and 37 and the connectors 55, 56, and 57.

What is claimed is:

1. A loading and unloading system for a load in a container, the loading and unloading system comprising:
   a robot including a robot arm capable of performing handling of the load;
   an automated guided vehicle on which the robot is mounted, the automated guided vehicle including a travel driving unit that causes the automated guided vehicle to travel;
   a transport conveyor that conveys the load;
   a robot controller that controls an operation of the robot arm and supplies driving electric power to the robot arm; and
   a power receiving unit that receives electric power to be supplied to the robot controller and the transport conveyor from outside of the loading and unloading system, wherein
   the automated guided vehicle further includes:
   a transport controller that controls driving of the travel driving unit and driving of the transport conveyor; and
   a battery that supplies electric power to the transport controller and refrains from supplying electric power to the robot controller and the transport conveyor, and
   the transport controller and the robot controller cooperate with each other to cause the transport conveyor to interlock with the robot arm, thereby performing the handling of the load.

2. The loading and unloading system according to claim 1, further comprising
   a power supply wiring that distributes and supplies the electric power received from the outside by the power receiving unit, to the robot controller and the transport conveyor, wherein
   the automated guided vehicle and the transport conveyor are connectable to and disconnectable from each other with a connector, and
   the power supply wiring is connected to the transport conveyor with the connector.

3. The loading and unloading system according to claim 1, wherein
   the transport controller includes:
   a position estimating unit that estimates a current position of the automated guided vehicle; and
   a conveyor controlling unit that cuts off supply of the electric power received by the power receiving unit to the transport conveyor in a case where the current position estimated by the position estimating unit is different from a handling position set in advance for the handling.

4. The loading and unloading system according to claim 1, wherein
   the automated guided vehicle further includes a first obstacle sensor that detects an obstacle, and
   the transport controller includes a conveyor controlling unit that cuts off supply of the electric power received by the power receiving unit to the transport conveyor in a case where the first obstacle sensor detects the obstacle in a first field set in advance around the automated guided vehicle.

5. The loading and unloading system according to claim 1, wherein
   the transport conveyor further includes a second obstacle sensor that detects an obstacle, and
   the transport controller includes a conveyor controlling unit that cuts off supply of the electric power received by the power receiving unit to the transport conveyor in a case where the second obstacle sensor detects the obstacle in a second field set in advance around the transport conveyor.

6. The loading and unloading system according to claim 1, wherein
   the robot includes:
   a camera that captures an image; and
   an image processing computer that performs image processing on the image captured by the camera,
   the image processing computer needs predetermined time for startup and shutdown, and
   the battery supplies operating electric power for the image processing computer.

7. The loading and unloading system according to claim 1, further comprising
   an external signal receiving unit that receives a predetermined external signal from the outside of the loading and unloading system, wherein
   the transport controller controls the transport conveyor based on the external signal.

8. The loading and unloading system according to claim 7, wherein
   the external signal receiving unit is a connector for the external signal.

* * * * *